(12) United States Patent
Sleator

(10) Patent No.: US 11,855,691 B1
(45) Date of Patent: *Dec. 26, 2023

(54) VEHICLE WITH FREE-SPACE OPTICAL LINK FOR LOG DATA UPLOADING

(71) Applicant: Waymo LLC, Mountain View, CA (US)

(72) Inventor: Michael Sleator, Woodside, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/831,084

(22) Filed: Jun. 2, 2022

Related U.S. Application Data

(63) Continuation of application No. 17/155,161, filed on Jan. 22, 2021, now Pat. No. 11,381,308, which is a continuation of application No. 16/678,458, filed on Nov. 8, 2019, now Pat. No. 10,931,374.

(60) Provisional application No. 62/779,142, filed on Dec. 13, 2018.

(51) Int. Cl.
| | |
|---|---|
| H04B 10/11 | (2013.01) |
| H04B 10/112 | (2013.01) |
| G05D 1/00 | (2006.01) |
| B60W 30/18 | (2012.01) |
| H04B 10/50 | (2013.01) |
| G05D 1/02 | (2020.01) |

(52) U.S. Cl.
CPC ....... *H04B 10/1123* (2013.01); *B60W 30/181* (2013.01); *G05D 1/0022* (2013.01); *G05D 1/0223* (2013.01); *G05D 1/0231* (2013.01); *H04B 10/1129* (2013.01); *H04B 10/503* (2013.01); *H04B 10/11* (2013.01)

(58) Field of Classification Search
CPC ............ H04B 10/1123; H04B 10/1129; H04B 10/503; H04B 10/11; B60W 30/181; G05D 1/0022; G05D 1/0223; G05D 1/0231
USPC .................................................. 398/118–131
See application file for complete search history.

(56) References Cited

U.S. PATENT DOCUMENTS

| | | | | |
|---|---|---|---|---|
| 5,724,168 | A * | 3/1998 | Oschmann | H04B 10/40 398/127 |
| 5,909,296 | A | 6/1999 | Tsacoyeanes | |
| 6,509,992 | B1 * | 1/2003 | Goodwill | H04B 10/1141 398/131 |
| 6,577,421 | B1 | 6/2003 | Cheng et al. | |

(Continued)

*Primary Examiner* — Dibson J Sanchez
(74) *Attorney, Agent, or Firm* — Botus Churchill IP Law LLP

(57) ABSTRACT

The disclosure describes a system that includes a self-driving system for operating a vehicle autonomously, one or more optical transmitters mounted on the vehicle, and one or more computing devices in communication with the self-driving system and the one or more optical transmitters. The one or more computing devices are configured to operate the self-driving system to cause the vehicle to approach a designated location in proximity of a structure on which one or more receivers are mounted and determine that the one or more optical transmitters have an alignment with the one or more receivers. Then, the one or more computing devices are configured to operate the one or more optical transmitters to establish an optical communication link with the one or more receivers and transmit data to the one or more receivers over the optical communication link.

21 Claims, 7 Drawing Sheets

(56) References Cited

U.S. PATENT DOCUMENTS

| | | |
|---|---|---|
| 6,603,865 B1 | 8/2003 | Yagi et al. |
| 6,775,480 B1 * | 8/2004 | Goodwill ............... H04B 10/11 398/151 |
| 7,791,503 B2 | 9/2010 | Breed et al. |
| 8,391,720 B2 * | 3/2013 | Jang .................... H04B 10/116 398/118 |
| 9,449,512 B2 | 9/2016 | Zafiroglu et al. |
| 9,645,577 B1 * | 5/2017 | Frazzoli ................ B60W 30/00 |
| 10,118,548 B1 | 11/2018 | Fields et al. |
| 10,466,716 B1 | 11/2019 | Su et al. |
| 10,567,079 B1 | 2/2020 | Inskeep et al. |
| 11,381,314 B2 * | 7/2022 | Searcy ................. H04B 10/532 |
| 2002/0149811 A1 | 10/2002 | Willebrand |
| 2002/0181036 A1 * | 12/2002 | Achour .............. H04B 10/1123 398/2 |
| 2002/0196506 A1 | 12/2002 | Graves et al. |
| 2003/0102997 A1 | 6/2003 | Levin et al. |
| 2004/0057730 A1 | 3/2004 | Littlejohn et al. |
| 2004/0258415 A1 | 12/2004 | Boone et al. |
| 2005/0129407 A1 | 6/2005 | Coleman |
| 2006/0018661 A1 | 1/2006 | Green et al. |
| 2006/0062099 A1 | 3/2006 | Yazaki et al. |
| 2007/0031152 A1 * | 2/2007 | Eitane ................ H04B 10/1127 398/131 |
| 2009/0252499 A1 | 10/2009 | Rotgaizer |
| 2010/0324782 A1 * | 12/2010 | Gupta ............. B60W 30/18009 701/41 |
| 2011/0033181 A1 * | 2/2011 | Jang .................... H04B 10/116 398/43 |
| 2013/0082162 A1 | 4/2013 | Eide |
| 2014/0161466 A1 * | 6/2014 | Riza .................. H04B 10/1149 398/119 |
| 2014/0328597 A1 * | 11/2014 | Bhide ................ H04B 10/1121 398/118 |
| 2015/0023668 A1 | 1/2015 | Spaulding et al. |
| 2015/0149022 A1 * | 5/2015 | Harvey .................. G05B 15/02 701/23 |
| 2015/0149265 A1 | 5/2015 | Huntzicker et al. |
| 2015/0156568 A1 * | 6/2015 | Byers ................. H04B 10/1149 398/55 |
| 2015/0215040 A1 | 7/2015 | Dickson et al. |
| 2015/0295644 A1 * | 10/2015 | Zhou ................. H04B 10/1123 398/115 |
| 2015/0349881 A1 | 12/2015 | Byers |
| 2015/0353080 A1 | 12/2015 | Mukaiyama |
| 2016/0087722 A1 | 3/2016 | Wabnig et al. |
| 2016/0116293 A1 * | 4/2016 | Grover .................. G08G 1/005 701/23 |
| 2016/0171894 A1 | 6/2016 | Harvey |
| 2016/0321929 A1 | 11/2016 | Nordbruch et al. |
| 2017/0144654 A1 | 5/2017 | Sham |
| 2017/0168503 A1 | 6/2017 | Amla et al. |
| 2017/0267233 A1 | 9/2017 | Minster. et al. |
| 2017/0317748 A1 | 11/2017 | Krapf |
| 2017/0346565 A1 * | 11/2017 | Dawson ............. H04B 10/1129 |
| 2017/0353350 A1 | 12/2017 | Gussen et al. |
| 2018/0136643 A1 | 5/2018 | Tao et al. |
| 2018/0188371 A1 | 7/2018 | Bao et al. |
| 2018/0196139 A1 | 7/2018 | Brown et al. |
| 2018/0219634 A1 | 8/2018 | Laski et al. |
| 2018/0234180 A1 * | 8/2018 | Takahashi ............. H04B 10/61 |
| 2018/0257661 A1 | 9/2018 | Kroop et al. |
| 2019/0044616 A1 | 2/2019 | Laski et al. |
| 2019/0052359 A1 | 2/2019 | Brady et al. |
| 2019/0080612 A1 | 3/2019 | Weissman et al. |
| 2019/0082520 A1 * | 3/2019 | Noshad ................. H05B 47/19 |
| 2019/0146516 A1 | 5/2019 | Eshima |
| 2019/0253142 A1 | 8/2019 | Griffith et al. |
| 2019/0306956 A1 * | 10/2019 | Kim ................... H04B 10/1129 |
| 2019/0367012 A1 | 12/2019 | Matta et al. |
| 2020/0162980 A1 * | 5/2020 | Kalkunte ............. H04W 72/23 |
| 2020/0295831 A1 | 9/2020 | Watanabe et al. |
| 2020/0336210 A1 * | 10/2020 | Khatibzadeh ...... H04B 10/1149 |

* cited by examiner

US 11,855,691 B1

VEHICLE WITH FREE-SPACE OPTICAL LINK FOR LOG DATA UPLOADING

CROSS REFERENCE TO RELATED APPLICATIONS

The present application is a continuation of U.S. patent application Ser. No. 17/155,161, filed Jan. 22, 2021, which is a continuation of U.S. patent application Ser. No. 16/678,458, filed Nov. 8, 2019, now issued as U.S. Pat. No. 10,931,374, which claims the benefit of the filing date of U.S. Provisional Application No. 62/779,142, filed Dec. 13, 2018, the entire disclosures of which are incorporated herein by reference.

BACKGROUND

Autonomous vehicles, such as vehicles that do not require a human driver, can be used to aid in the transport of passengers or items from one location to another. Such vehicles may operate in a fully autonomous mode where passengers may provide some initial input, such as a pickup or destination location, and the vehicle maneuvers itself to that location. While in operation, autonomous vehicles may collect large amounts of data, such as location data, object data, or sensor data. The collected data may need to be offloaded to make room for new data, to be communicated to other systems, or for a variety of other reasons.

BRIEF SUMMARY

Aspects of the disclosure provide for a system that includes a self-driving system for operating a vehicle autonomously, one or more optical transmitters mounted on the vehicle, and one or more computing devices in communication with the self-driving system and the one or more optical transmitters. The one or more computing devices are configured to operate the self-driving system to cause the vehicle to approach a designated location in proximity of a structure on which one or more receivers are mounted, and determine when the one or more optical transmitters have an alignment with the one or more receivers. When the alignment is determined, the one or more computing devices use the one or more optical transmitters to establish at least one optical communication link with the one or more receivers, and transmit data from the one or more optical transmitters to the one or more receivers over the at least one optical communication link.

In one example, the one or more optical transmitters are configured to output a plurality of optical communication beams at different angles. In this example, the plurality of optical communication beams is coplanar and overlapping. Also in this example, the one or more computing devices are also configured to select a given transmitter of the one or more transmitters with which to establish the at least one optical communication link based on an amount of received power by the one or more receivers.

In another example, the one or more receivers are in communication with a remote computing device configured to process the transmitted data from the one or more optical transmitters. In a further example, a first portion of the one or more optical transmitters is positioned to point through an exterior surface of the vehicle, and a second portion of the one or more optical transmitters are positioned within an interior of the vehicle. In yet another example, the system also includes the vehicle.

Other aspects of the disclosure provide for a method for transferring data from a vehicle. The method includes operating, by one or more computing devices, the vehicle in an autonomous manner to approach a designated location in proximity of a structure on which one or more receivers are mounted. The vehicle includes one or more optical transmitters. The method also includes using the one or more computing devices to determine when the one or more optical transmitters have an alignment with the one or more receivers, establish at least one optical communication link with the one or more receivers using the one or more optical transmitters when the alignment is determined, and transmit data from the one or more optical transmitters to the one or more receivers over the at least one optical communication link.

In one example, determining when the one or more optical transmitters have the alignment with the one or more receivers includes transmitting an optical communication beam and determining when a threshold amount of power of the optical communication beam has been received by the one or more receivers. In this example, the threshold amount of power is greater than the minimum amount of power. Optionally in this example, the method also includes stopping a motion of the vehicle when it is determined that the threshold amount of power has been received. Additionally or alternatively in this example, determining when the one or more optical transmitters have the alignment with the one or more receivers also includes determining when a minimum amount of power of the optical communication beam has been received by the one or more receivers, and slowing a motion of the vehicle when it is determined that the minimum amount of power has been received.

In another example, establishing the at least one optical communication link with the one or more receivers includes transmitting a plurality of optical communication beams, selecting a given beam of the plurality of optical communication beams that has a greatest amount of received power at the one or more receivers, and establishing an optical communication link using the given beam. In this other example, the plurality of optical communication beams is optionally projected at different angles. The plurality of optical communication beams is also optionally coplanar and overlapping at least one other beam in the plurality of optical communication beams.

In a further example, establishing at least one optical communication link with the one or more receivers includes transmitting an optical communication beam from the one or more optical transmitters, selecting a given receiver of the one or more receivers that has a greatest amount of received power from the optical communication beam, and establishing an optical communication link between the one or more optical transmitters and the given receiver. In yet another example, establishing at least one optical communication link with the one or more receivers includes transmitting an optical communication beam at a first pointing direction from the one or more optical transmitters, receiving an indication of a first amount of received power from a remote computing device in communication with the one or more receivers, and adjusting the optical communication beam to a second pointing direction. In this example, establishing at least one optical communication link with the one or more receivers further includes receiving an indication of a second amount of received power from the remote computing device where the second amount of received power being greater than the first amount of received power, and establishing an optical communication link between the one or more optical transmitters and the one or more receivers using the second pointing direction after receiving the indication of the second amount of received power that is greater than the first amount of received power.

Further aspects of the disclosure provide for a non-transitory, tangible computer-readable storage medium on which computer readable instructions of a program are stored. The instructions, when executed by one or more processors, cause the one or more processors to perform a method. The method includes operating a vehicle in an autonomous manner to approach a designated location in proximity of a structure on which one or more receivers are mounted, the vehicle including one or more optical transmitters, determining when the one or more optical transmitters have an alignment with the one or more receivers, using the one or more optical transmitters to establish at least one optical communication link with the one or more receivers when the alignment is determined, and transmitting data from the one or more optical transmitters to the one or more receivers over the at least one optical communication link.

In one example, determining when the one or more optical transmitters have the alignment with the one or more receivers includes transmitting an optical communication beam, and determining when a threshold amount of power of the optical communication beam has been received by the one or more receivers. The threshold amount of power in this example is greater than the minimum amount of power. In another example, the method also includes stopping a motion of the vehicle when it is determined that the threshold amount of power has been received. In a further example, determining when the one or more optical transmitters have the alignment with the one or more receivers also includes determining when a minimum amount of power of the optical communication beam has been received by the one or more receivers, and slowing a motion of the vehicle when it is determined that the minimum amount of power has been received.

DETAILED DESCRIPTION

Overview

The technology relates to a system for transferring data from an autonomous vehicle to a remote computing device. The system includes transmitters and receivers configured for free-space optical communication. A first set of transmitters and receivers are on the autonomous vehicle, and a second set of transmitters and receivers are at the remote computing device. The remote computing device may be located in a building or fixture that is not part of the vehicle, such as a parking garage, a maintenance facility, a gas or charging station, a car wash, or other type of building.

A first computing device may be configured to control the vehicle to approach a designated location in proximity of the remote computing device. The designated location may be where the first set of transmitters and receivers would be aligned with the second set of transmitters and receivers. The first computing device may then be configured to determine when the first set of transmitters and receivers are properly aligned with the second set of transmitters and receivers in order to establish one or more optical communication links between the first set and the second set. Via the first set and the second set of transmitters and receivers, the first computing device may establish one or more optical communication links with the remote computing device. The first computing device may then transmit data to the second computing device over the one or more optical communication links that are established. The remote computing device may store the received data or transmit the received data to another computing device via a network.

The features described herein may provide for a faster transfer of a high volume of data from an autonomous vehicle to a remote computing device through the use of free-space optical communication links. Free-space optical links also are subject to less component wear and tear as they use fewer cables and connectors than wired connections. The features also allow for the alignment and establishment of an optical communication link between the vehicle and the remote computing device to be performed autonomously, without human intervention.

Example Systems

Figure 1:
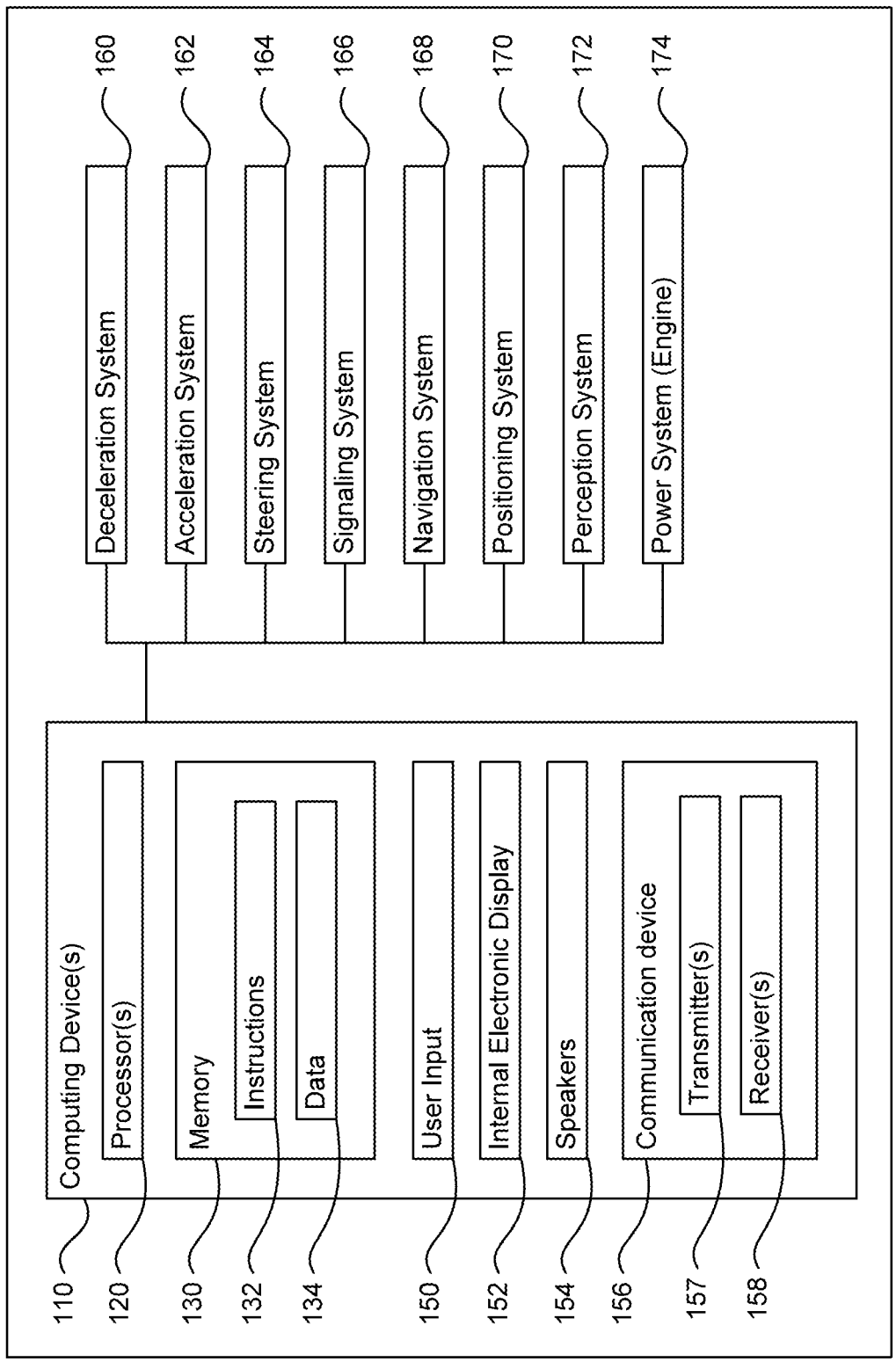
FIG. 1 is a functional diagram of an example vehicle in accordance with aspects of the disclosure.

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, busses, recreational vehicles, etc. The vehicle may have one or more computing devices, such as computing device 110 containing one or more processors 120, memory 130 and other components typically present in general purpose computing devices.

The memory 130 stores information accessible by the one or more processors 120, including instructions 132 and data 134 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. As an example, data 134 of memory 130 may store predefined scenarios. A given scenario may identify a set of scenario requirements including a type of object, a range of locations of the object relative to the vehicle, as well as other factors such as whether the autonomous vehicle is able to maneuver around the object, whether the object is using a turn signal, the condition of a traffic light relevant to the current location of the object, whether the object is approaching a stop sign, etc. The requirements may include discrete values, such as "right turn signal is on" or "in a right turn only lane", or ranges of values such as "having an heading that is oriented at an angle that is 30 to 60 degrees offset from a current path of the vehicle." In some examples, the predetermined scenarios may include similar information for multiple objects.

The one or more processor 120 may be any conventional processors, such as commercially available CPUs. Alternatively, the one or more processors may be a dedicated device such as an ASIC or other hardware-based processor. Although FIG. 1 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. As an example, internal electronic display 152 may be controlled by a dedicated computing device having its own CPU or other processor, memory, etc. which may interface with the computing device 110 via a high-bandwidth or other network connection. In some examples, this computing device may be a user interface computing device which can communicate with a user's client device. Similarly, the memory may be a hard drive or other storage media located in a housing different from that of computing device 110. Accordingly, references to a processor or computing device will be understood to include references to a collection of processors or computing devices or memories that may or may not operate in parallel.

Computing device 110 may have all of the components normally used in connection with a computing device such as the processor and memory described above as well as a user input 150 (e.g., a mouse, keyboard, touch screen and/or microphone) and various electronic displays (e.g., a monitor having a screen or any other electrical device that is operable to display information). In this example, the vehicle includes an internal electronic display 152 as well as one or more speakers 154 to provide information or audio visual experiences. In this regard, internal electronic display 152 may be located within a cabin of vehicle 100 and may be used by computing device 110 to provide information to passengers within the vehicle 100. In addition to internal speakers, the one or more speakers 154 may include external speakers that are arranged at various locations on the vehicle in order to provide audible notifications to objects external to the vehicle 100.

The computing device 110 of vehicle 100 may also receive or transfer information to and from other computing devices, for instance using communication device 156. As shown in FIG. 1, communication device 156 includes one or more transmitters 157 and one or more receivers 158. In some implementations, the one or more transmitters 157 and the one or more receivers 158 may be part of a transceiver arrangement in the communication device 156. The one or more processors 120 may therefore be configured to transmit, via the one or more transmitters 157, data in a signal, and also may be configured to receive, via the one or more receivers 158, communications and data in the form of a signal. The transmitted or received signal may be configured to travel through free space, such as, for example, an optical signal and/or a radio-frequency signal.

The one or more transmitters 157 may include a laser module, an optical fiber, and a lens system. The signal transmitted by the one or more transmitters 157 may have a set beam divergence or a variable beam divergence. The one or more receivers 158 may include a lens system and an optical fiber, and a sensor. The sensor may include, but is not limited to, a position sensitive detector (PSD), a charge-coupled device (CCD) camera, a focal plane array, a photodetector, a quad-cell detector array, or a CMOS sensor. The sensor is configured to receive a signal and convert the received optical beam into an electric signal using the photoelectric effect.

In one example, computing device 110 may be an autonomous driving computing system incorporated into vehicle 100. The autonomous driving computing system may be capable of communicating with various components of the vehicle. For example, computing device 110 may be in communication with various systems of vehicle 100, such as deceleration system 160 (for controlling braking of the vehicle), acceleration system 162 (for controlling acceleration of the vehicle), steering system 164 (for controlling the orientation of the wheels and direction of the vehicle), signaling system 166 (for controlling turn signals), navigation system 168 (for navigating the vehicle to a location or around objects), positioning system 170 (for determining the position of the vehicle), perception system 172 (for detecting objects in the vehicle's environment), and power system 174 (for example, a battery and/or gas or diesel powered engine) in order to control the movement, speed, etc. of vehicle 100 in accordance with the instructions 132 of memory 130 in an autonomous driving mode which does not require or need continuous or periodic input from a passenger of the vehicle. Again, although these systems are shown as external to computing device 110, in actuality, these systems may also be incorporated into computing device 110, again as an autonomous driving computing system for controlling vehicle 100.

The computing device 110 may control the direction and speed of the vehicle by controlling various components. By way of example, computing device 110 may navigate the vehicle to a destination location completely autonomously using data from the map information and navigation system 168. Computing device 110 may use the positioning system 170 to determine the vehicle's location and perception system 172 to detect and respond to objects when needed to reach the location safely. In order to do so, computing device 110 may cause the vehicle to accelerate (e.g., by increasing fuel or other energy provided to the engine by acceleration system 162), decelerate (e.g., by decreasing the fuel supplied to the engine, changing gears, and/or by applying brakes by deceleration system 160), change direction (e.g., by turning the front or rear wheels of vehicle 100 by steering system 164), and signal such changes (e.g., by lighting turn signals of signaling system 166). Thus, the acceleration system 162 and deceleration system 160 may be a part of a drivetrain that includes various components between an engine of the vehicle and the wheels of the vehicle. Again, by controlling these systems, computing device 110 may also control the drivetrain of the vehicle in order to maneuver the vehicle autonomously.

As an example, computing device 110 may interact with deceleration system 160 and acceleration system 162 in order to control the speed of the vehicle. Similarly, steering system 164 may be used by computing device 110 in order to control the direction of vehicle 100. For example, if vehicle 100 is configured for use on a road, such as a car or truck, the steering system may include components to control the angle of wheels to turn the vehicle. Signaling system 166 may be used by computing device 110 in order to signal the vehicle's intent to other drivers or vehicles, for example, by lighting turn signals or brake lights when needed. Navigation system 168 may be used by computing device 110 in order to determine and follow a route to a location. In this regard, the navigation system 168 and/or data 134 may store map information, e.g., highly detailed maps that computing device 110 can use to navigate or control the vehicle.

The perception system 172 also includes one or more components for detecting objects external to the vehicle such as other vehicles, obstacles in the roadway, traffic signals, signs, trees, etc. For example, the perception system 172 may include one or more LIDAR sensors, sonar devices, radar units, cameras and/or any other detection devices that record data which may be processed by computing device 110. The sensors of the perception system may detect objects and their characteristics such as location, orientation, size, shape, type (for instance, vehicle, pedestrian, bicyclist, etc.), heading, and speed of movement, etc. The raw data from the sensors and/or the aforementioned characteristics can be quantified or arranged into a descriptive function, vector, and or bounding box and sent for further processing to the computing device 110 periodically and continuously as it is generated by the perception system 172. As discussed in further detail below, computing device 110 may use the positioning system 170 to determine the vehicle's location and perception system 172 to detect and respond to objects when needed to reach the location safely.

Figure 2:
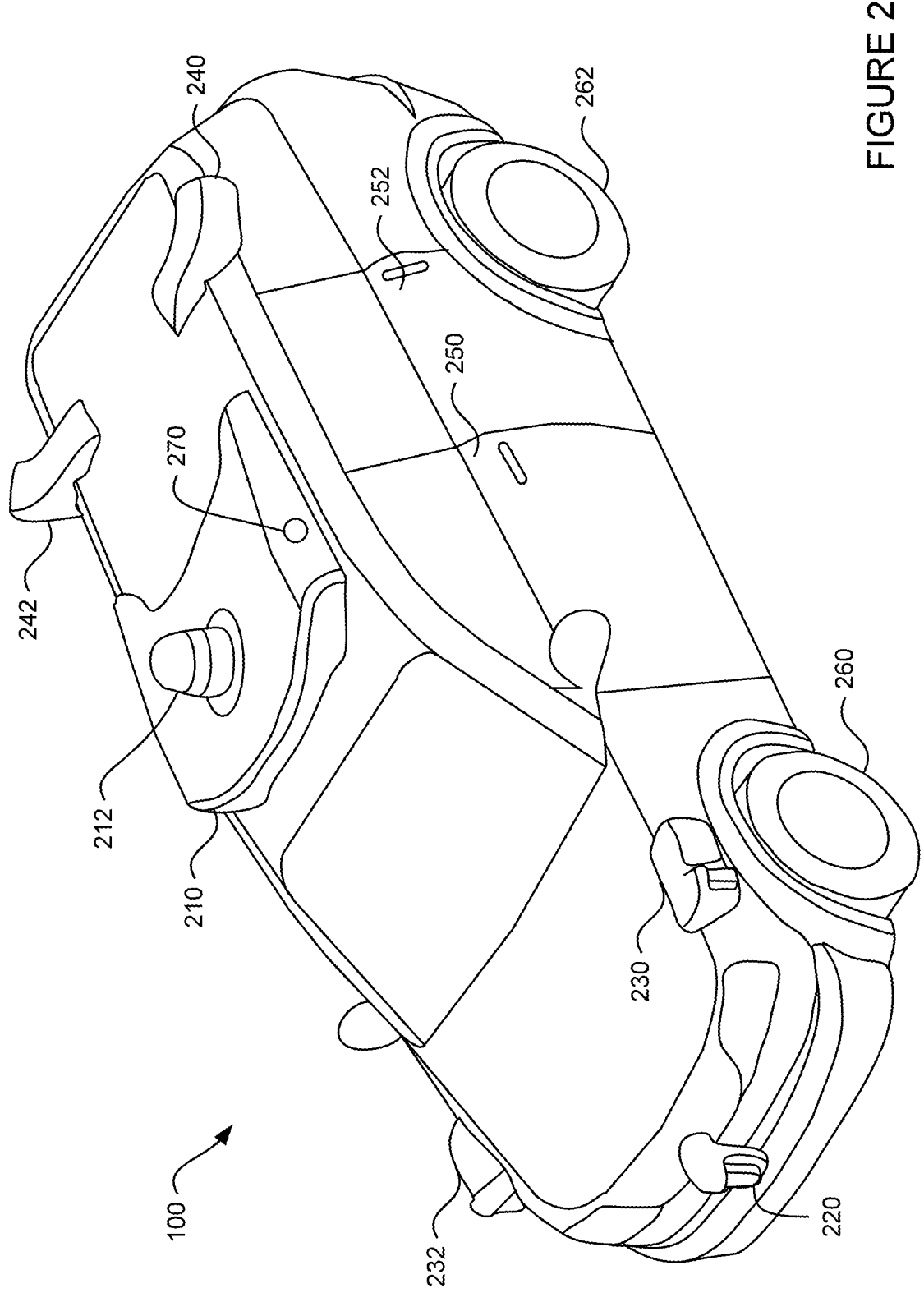
FIG. 2 is an example external view of a vehicle in accordance with aspects of the disclosure.

FIG. 2 is an example external view of vehicle 100. In this example, roof-top housing 210 and dome housing 212 may include a LIDAR sensor as well as various cameras and radar units. In addition, housing 220 located at the front end of vehicle 100 and housings 230, 232 on the driver's and passenger's sides of the vehicle may each store a LIDAR sensor. For example, housing 230 is located in front of driver door 250. Vehicle 100 also includes housings 240, 242 for radar units and/or cameras also located on the roof of vehicle 100. Additional radar units and cameras (not shown) may be located at the front and rear ends of vehicle 100 and/or on other positions along the roof or roof-top housing 210. Vehicle 100 also includes many features of a typical passenger vehicle such as doors 250, 252, wheels 260, 262, etc.

As further shown in FIG. 2, at least a first portion of the one or more transmitters 157 and one or more receivers 158 of the communication device 156 may be mounted on the vehicle at least in part at location 270 within the roof-top housing 210, which is at a left-side edge of the roof-top housing 210. For example, the lens system of the one or more transmitters 157 or the lens system of the one or more receivers 158 may be positioned at location 270. Other locations for the one or more transmitters 157 and one or more receivers 158 may be used. In addition, the one or more transmitters 157 and one or more receivers 158 may be mounted to point in a fixed direction relative to the vehicle. The fixed direction may be perpendicular to a front-back longitudinal axis of the vehicle 100, such as 90 degrees counterclockwise from a heading of the vehicle. In some implementations, the first portion may also include a gimbal or other mechanism for physically adjusting the pointing direction of the optical communication beam 350 and/or a phased array or other mechanism for electronically adjusting the pointing direction of the optical communication beam 350. A second portion of the one or more transmitters 157 and one or more receivers 158, such as the laser module of the one or more transmitters 157 or the sensor of the one or more receivers 158, may be stored in another part of the vehicle 100, such as a trunk or a nose of the vehicle 100. The first portion and the second portion of the one or more transmitters 157 or the one or more receivers may be connected via optical fibers.

Figure 3A:
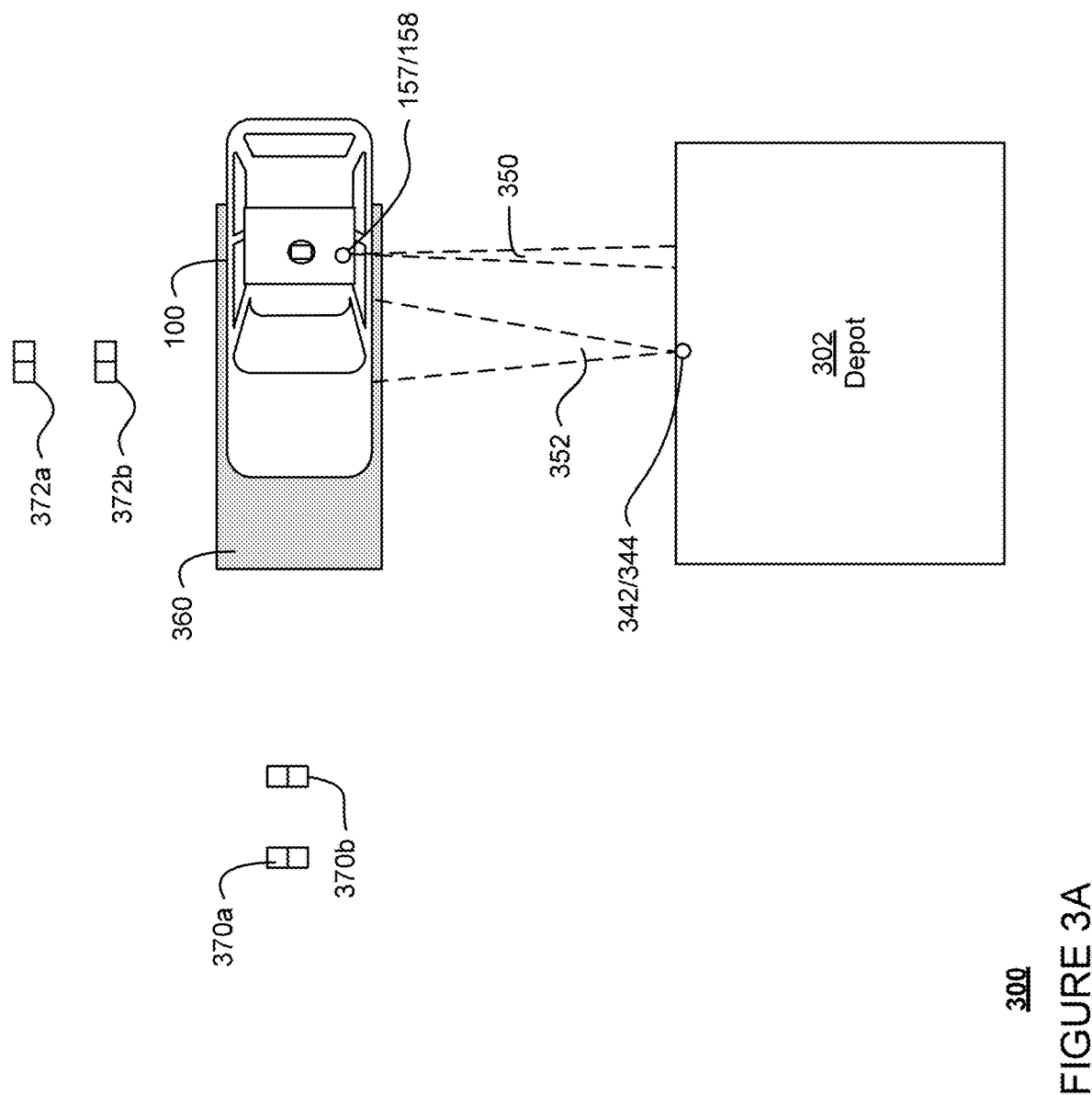
FIGS. 3A, 3B, and 3C are example pictorial diagrams of a system in accordance with aspects of the disclosure.
Figure 3B:
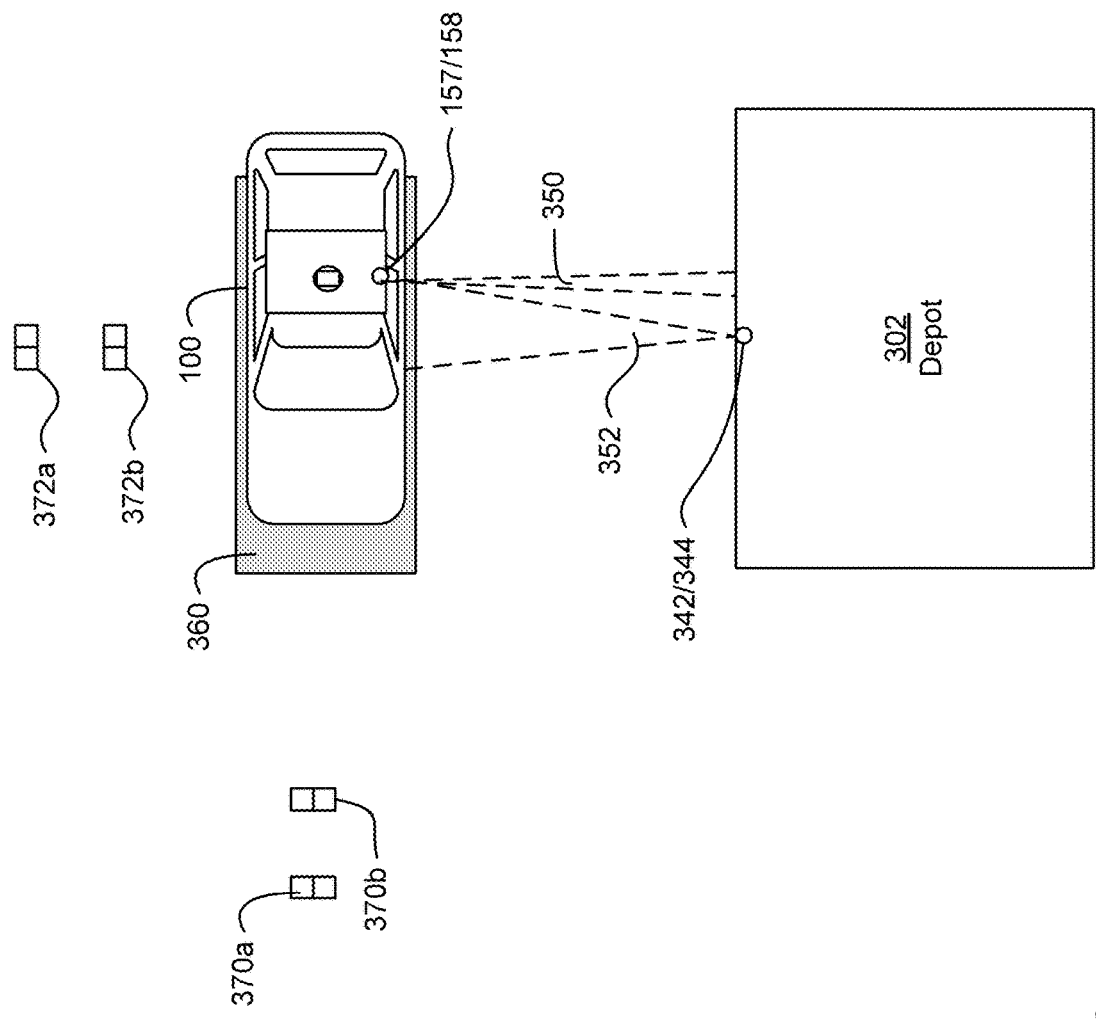
Figure 3C:
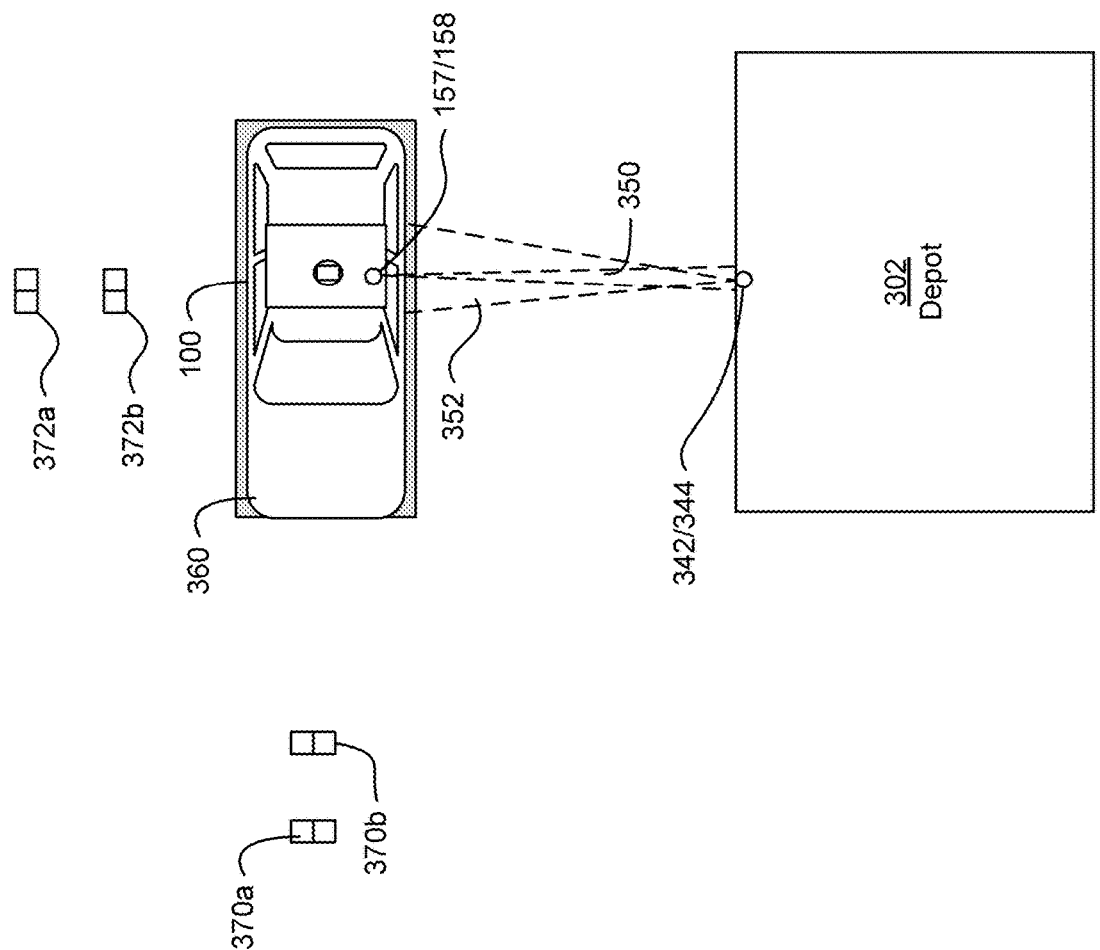
Figure 4:
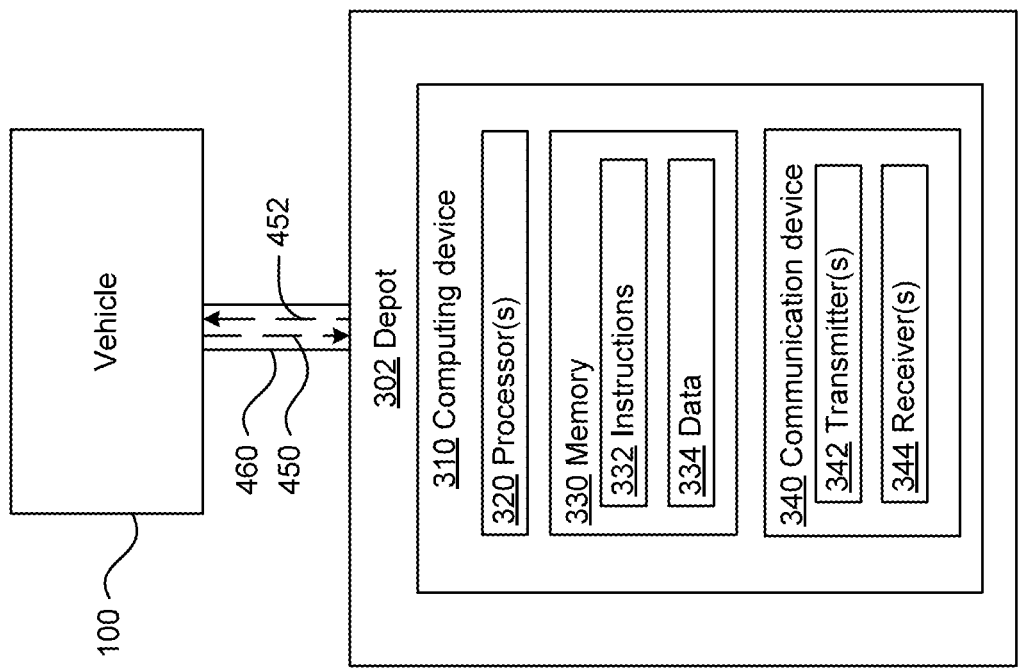
FIG. 4 is an example functional diagram of a system in accordance with aspects of the disclosure.

FIGS. 3A-3C are pictorial diagrams of an example system 300 that includes the vehicle 100 and a depot 302. FIG. 4 is a corresponding functional diagram of the example system 300. The depot 302 may be a fixed infrastructure accessible by the vehicle 100, such as a parking garage, a maintenance facility, a gas or charging station, a car wash, or other type of structure. For instance, rather than being a structure large enough for a vehicle to enter, the depot 302 may simply be a stand-alone structure such as a post or kiosk. As shown in FIG. 4, the depot 302 may include one or more computing devices, such as computing device 310.

Like computing device 110, computing device 310 may include one or more processors 320, memory 330, instructions 332, data 334, communication device 340, one or more transmitters 342, and one or more receivers 344. Such processors, memories, instructions, data, communication device, one or more transmitter, and one or more receivers may be configured similarly to one or more processors 120, memory 130, instructions 132, data 134, communication device 156, one or more transmitters 157 and one or more receivers 158 of computing device 110. In addition, the one or more transmitters 342 and the one or more receivers 344 may be mounted at a same height as the one or more transmitters 157 and the one or more receivers 158. Alternatively, the one or more transmitters 342 and the one or more receivers 344 may be mounted at the depot 302 such that the one or more transmitters 342 and the one or more receivers 344 point at least approximately at a location of the one or more transmitters 157 and one or more receivers 158 when the vehicle 100 is at a designated location 360.

Like the one or more receivers 158, the one or more receivers 344 may include a lens system and an optical fiber, and a sensor. The sensor may be a first sensor, and the one or more receivers 344 may also include a second sensor that is larger than the first sensor. For example, the first sensor may have a width or diameter of 50 microns, and the second sensor may have a width or diameter of 5 millimeters. The larger size of the second sensor may allow for a quicker search process for an optical communication beam transmitted from the one or more transmitters 157, as described below. The second sensor may have a known position relative to the first sensor. Specifically, a center of the second sensor may have a known position relative to a center of the first sensor. Alternatively, the one or more receivers 344 may include a mirror or lens that diverts a portion of the optical communication beam directed to the first sensor towards the second sensor.

In some implementations, the communication device 340 may include a translation stage. The translation stage may be configured to adjust a position of the one or more receivers 344 horizontally and/or vertically with respect to the depot 302. In particular, as position of the first and/or second sensor of the one or more receivers 344 may be adjusted by the translation stage relative to the lens system of the one or more receivers 344. When moved by the translation stage, the position of the second sensor relative to the first sensor may remain fixed. A position of the one or more transmitters 342 may also be adjusted horizontally and/or vertically using the translation stage. The translation stage may be, for example, a platform capable of moving side to side and/or up and down, a gimbal, or other type of moving stage in one or two dimensions.

In some examples, the one or more receivers 344 may have a wider field of view than the one or more receivers 158, such as a wider aperture. Alternatively, the one or more receivers 344 may comprise a plurality of receivers that have fields of view that partially overlap that of at least one other receiver in the plurality of receivers. The aggregate field of view of the plurality of receivers is therefore greater than an individual receiver.

As shown in FIGS. 3A-3C, the one or more transmitters 157 of the vehicle may be configured to output a signal in the form of an optical communication beam 350. The optical communication beam 350 may operate at a particular frequency or particular wavelength, such as 850 nm, and have a set beam divergence. The one or more transmitters 157 may alternatively be configured to output the signal in a plurality of optical communication beams at different angles. The plurality of optical communication beams may be coplanar and overlapping, or in a fan arrangement. For example, a plurality of lasers may be positioned in a row before a diverging lens to achieve the fan arrangement. A communication alignment is achieved when the communication beam 350 is pointed at the one or more receivers 344 of the depot 302 such that the one or more receivers 344 are able to receive the signal.

A designated location 360 may be a location at, in, or near the depot 302 for the communication alignment to occur. The designation of location 360 may be a point, a line, an area, a specific shape, or other form of location designation. In some implementations, a designated location 360 for the communication alignment may be predetermined for the vehicle 100 in relation to the depot 302 given the location of the one or more transmitters 157 on the vehicle and the one or more receivers 344 at the depot. In some implementations, the predetermined designated location 360 may be pre-stored or otherwise identified in the map information of the vehicle 100. The predetermined designated location 360 may also be indicated by one or more markers, for instance visual markers, that are detectable and recognizable by the perception system 172 of the vehicle 100.

For example, the one or more markers may include a first range marker 370 and a second range marker 372. The first range marker may include a first indicator 370a and a second indicator 370b that are positioned so that the first indicator 370a and the second indicator 370b are aligned from the perspective of the vehicle 100 when the vehicle has a correct pose relative to the depot 302. The first indicator 370a and the second indicator 370b may form a longitudinal range line along which a length of the vehicle 100 is to be positioned. The second range marker 372 may include a third indicator 372a and a fourth indicator 372b that are positioned so that the third indicator 372a and the fourth indicator 372b are aligned from the perspective of the vehicle 100 when the vehicle 100 has a correct angular position relative to the depot 302. The third indicator 372a and the fourth indicator 372b may form a transverse range line along which a width of the vehicle 100 is to be positioned.

In some alternative examples, the one or more transmitters 342 of the depot 302 may also be configured to output a signal in the form of an optical communication beam 352, as shown in FIGS. 3A-3C. The optical communication beam 352 may have a same or different frequency or beam divergence as the optical communication beam 350. In this example, the communication of alignment may be achieved when the communication beam 352 is pointed at the one or more receivers 158 of the vehicle 100 such that the one or more receivers 158 are able to receive the signal.

The relationship of the transmitters and receivers of the vehicle 100 and the depot 302 may be such that when the communication beam 350 is aligned with the one or more receivers 344, the communication beam 352 is also aligned with the one or more receivers 158.

Turning to FIG. 4, when the one or more transmitters 157 of the vehicle 100 are aligned with the one or more receivers 344 of the depot 302, an optical communication link 450 may be established through which data may be transmitted from the vehicle 100 to a remote computing device of the depot, for instance, computing device 310. When the one or more transmitters 342 of the depot 302 also transmits optical communication beam 352, an optical communication link 452 may be established with the one or more receivers 158 of the vehicle 100 through which data may be transmitted from the depot 302 to the vehicle 100. In this scenario, the optical communication links 450 and 452 may form a bi-directional communication channel 460. Other forms of links or channels may additionally or alternatively be formed between the vehicle 100 and the depot 302 via their respective transmitters and receivers, such as a radio-frequency control channel. In addition, the computing device 110 or computing device 310 may be configured to communicate with other computing devices or storage systems via a network, such as the Internet, intranets, virtual private networks, wide area networks, local networks, etc.

Example Methods

Figure 5:
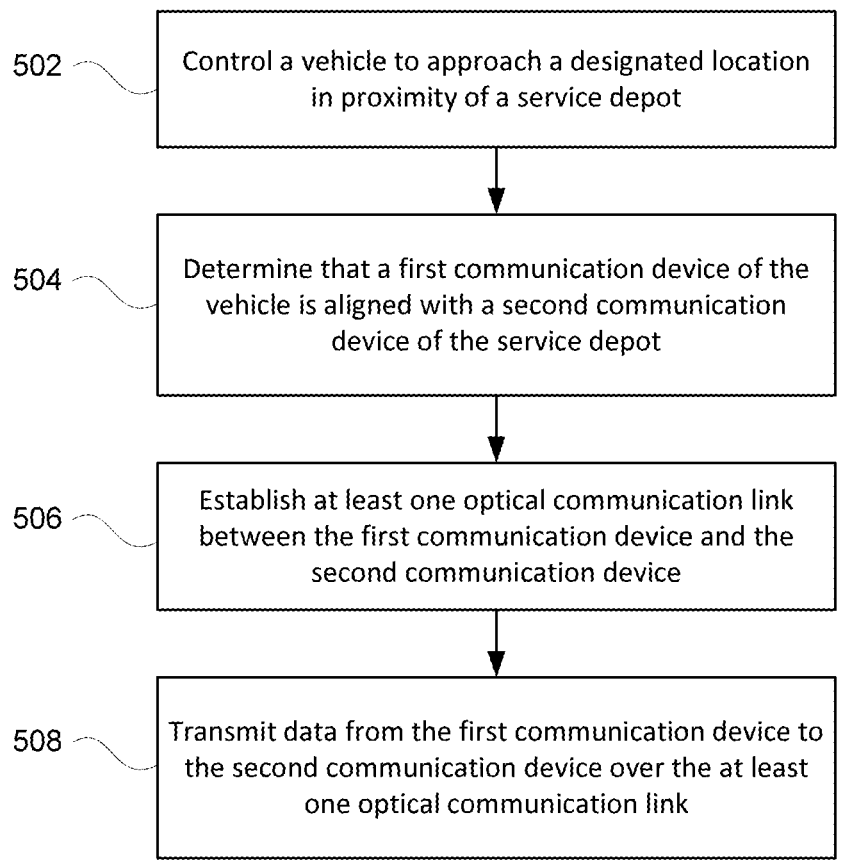
FIG. 5 is a flow diagram 500 of a method for establishing and operating a communication link using a vehicle in accordance with aspects of the disclosure.

In addition to the systems described above and illustrated in the figures, various operations will now be described. The computing device 110 may control the vehicle to establish a communication link with computing device 310 and transfer data as described below. In FIG. 5, flow diagram 500 is shown in accordance with aspects of the disclosure that may be performed by the computing device 110. While FIG. 5 shows blocks in a particular order, the order may be varied and that multiple operations may be performed simultaneously. Also, operations may be added or omitted.

At block 502, the computing device 110 may be configured to control the vehicle 100 to approach the designated location 360. The designated location may be where the communication device 156 of the vehicle 100 is likely to be aligned or close to alignment with the communication device 340 of the depot 302 for communication purposes. This communication alignment may be when a minimum amount of the optical communication beam 350 transmitted from the one or more transmitters 157 of the communication device 156 is detected at the one or more receivers 344 of the communication device 340.

The vehicle 100 may be controlled by the computing device 110 to move forward from a current location towards or through the designated location 360, as shown by the movement of vehicle 100 from a first location in FIG. 3A towards a second location in FIG. 3C. Using the positioning system 170, the computing device 110 may determine that, when at the first position shown in FIG. 3A, a front portion of the vehicle 100 is within the area of the designated location 360, but a back portion has not yet made it into the designated location 360. Additionally or alternatively, the positioning system 170 may detect an alignment of the first and second indicators of the first range marker 370 and an alignment of the third and fourth indicators of the second range marker 372. Determining an alignment may include determining a degree of misalignment, such as an angular distance between a given pair of indicators. The computing device 110 may determine that the vehicle 100 has not yet made it into the designated location 360 when at least one of the first range marker 370 or the second range marker 372 has a degree of misalignment. The computing device 110 may further cause the systems of the vehicle 100, such as steering system 164 and navigation system 168, to move the vehicle 100 forward through an intermediate location shown in FIG. 3B until the vehicle 100 is completely within the designated location 360, as shown in FIG. 3C. The computing device 110 may use the positioning system 170 to determine that the vehicle is within the designated location 360 by detecting that the degree of misalignment for both the first range marker 370 and the second range marker 372 is zero or within a threshold amount of zero, such as ±5 degrees.

At block 504, the computing device 110 may be configured to determine when the communication device 156 of the vehicle 100 is aligned with the communication device 340 of the depot 302. Determining the alignment includes transmitting an optical communication beam from one of the transmitters, such as optical communication beam 350 transmitted from the one or more transmitters 157 of the vehicle 100. The computing device 110 may output the optical communication beam 350 when the vehicle is within a set distance from the depot 302, the communication device 340, or the designated location 360. For example, when the vehicle 100 is at the first location shown in FIG. 3A, the computing device 110 may begin to output the optical communication beam 350.

Determining the alignment may also include determining when a minimum amount of power has been received from the optical communication beam. The minimum amount of power may be a preset value. The computing device 310 may detect the optical communication beam 350 and use the first or the second sensor of the one or more receivers 344 to determine an amount of received power. The amount of received power may be determined as a received signal strength indicator (RSSI) or other type of indicator. The amount of received power may be continually tracked as the vehicle 100 moves relative to the depot 302. When the one or more receivers 344 receives the minimum amount of power from the optical communication beam 350, the computing device 310 may transmit a signal to the computing device 110 indicating that the minimum amount of power is received. For example, when the vehicle 100 is at the intermediate location shown in FIG. 3B, the computing device 310 may determine that the minimum amount of power is received and may transmit an indication of such to the computing device 110.

The computing device 110 may receive the signal indicating that the minimum amount of power is received and, in response, slow down the forward motion of the vehicle 100. Slowing down the forward motion of the vehicle 100 may include releasing any applied drive to the acceleration system 162 and allowing the vehicle 100 to move forward at idle speed. In other scenarios slowing down the forward motion of the vehicle 100 may include applying the brakes to further slow the forward motion of the vehicle 100. The computing device 110 may then continually track the received amount of power by receiving updates to the RSSI from the computing device 310.

After determining a threshold amount of power that is higher than the minimum amount is received from the optical communication beam, the computing device 110 may stop the vehicle 100. In this example, the minimum amount of power indicates when the vehicle 100 is nearing the designated location 360 and should prepare to stop, and the threshold amount indicates proper alignment with the communication device 340 of the computing device 310. For example, when the vehicle 100 is at the second location as shown in FIG. 3C, the computing device 110 may receive a signal from the computing device 310 that indicates that the received amount of power at least meets the threshold amount of power, and the computing device 110 may stop the vehicle at the second location.

In another implementation, the computing device 110 may stop the vehicle after determining a maximum amount of power is received from the optical communication beam. For example, the computing device 110 may track the amount of power received continually or at regular intervals as the vehicle 100 moves relative to the depot 302. After the vehicle 100 moves through a plurality of locations, the computing device 110 may determine a highest amount of power received during the motion of the vehicle 100 and designate the highest amount as the maximum amount. The motion of the vehicle 100 through a plurality of locations may comprise maneuvering the vehicle 100 forward in a straight line. The computing device 110 may then maneuver the vehicle 100 to a location in the plurality of locations where the maximum amount of power was received. Maneuvering the vehicle 100 to the location where the maximum amount of power was received may comprise reversing the vehicle 100 along the straight line.

When the communication device 340 includes a translation stage, determining when the communication device 156 of the vehicle 100 is aligned with the communication device 340 of the depot 302 may further comprise moving the one or more receivers 344 at the depot 302 using the translation stage. The movement of the one or more receivers 344 may be controlled by the one or more processors 320 of the depot 310 and depend on a location where the optical communication beam 350 is received at the first or second sensor of the one or more receivers 344.

In some implementations, the movement of the one or more receivers 344 may be performed in order to move the location where the optical communication beam 350 is received to a center of the first or second sensor. Moving the location to the center of the first or second sensor may include (i) a horizontal sweep to determine an x-coordinate of the center of the first or second sensor and (ii) a vertical sweep to determine a y-coordinate of the center of the first or second sensor. The horizontal sweep may include moving the translation stage horizontally by the one or more processors 320, detecting a change in power or other output received at the first or second sensor by the one or more processors 320, and determining where a first edge and a second edge of the first or second sensor is based on the change in power or other output received at the first or second sensor. When no change in power or other output is detected in an initial horizontal sweep, the translation stage may be moved vertically up or down by at least approximately the height of the first or second sensor before performing another horizontal sweep. The vertical movement by at least approximately the height of the first or second sensor may be repeated prior to each horizontal sweep until a change in power or other output is detected during the horizontal sweep. The first edge and the second edge of the first or second sensor may be defined as a location where a particular amount of change, such as 10% increase or decrease, in power or other output is detected. The x-coordinate of the center may then be determined as a middle location between the first edge and the second edge. The vertical sweep may be performed at the determined middle location between the first edge and the second edge, and a third edge and a fourth edge of the first or second sensor may be identified as a location where a particular amount of change in power or other output is detected by the first or second sensor. The y-coordinate of the center may then be determined as a middle location between the third edge and the fourth edge. In some cases, the horizontal and vertical sweeps are performed for the second sensor to identify a center of the second sensor. Then, based on a predetermined, fixed relationship between the position of the first sensor and the position of the second sensor, the one or more processors 320 may determine where a center of the first sensor is based on the location of the center of the second senor and move the translation stage such that the optical communication beam 350 is received at the center of the first sensor. The position of the translation stage may be fine-tuned to maximize an amount of power received at the first sensor.

Alternatively, the movement of the one or more receivers 344 may be in a predetermined pattern, such as a spiral outward from a default start position. After moving the one or more receivers 344 in the predetermined pattern, the one or more processors 320 may determine a position in the predetermined pattern in which a maximum amount of power is received from the optical communication beam 350 and move the one or more receivers 344 into the determined position using the translation stage. Other search algorithms may be utilized depending on a type of sensor utilized in the one or more receivers 344.

When the optical communication beam 350 is received first at the second sensor of the one or more receivers 344, the movement of the one or more receivers 344 and the alignment determination may be based on where the optical communication beam 350 is received at the second sensor. After the position for the one or more receivers 344 is determined according to the alignment of the optical communication beam 350 to the second sensor, the one or more receivers 344 may be moved to a second position using the translation stage where the optical communication beam 350 is received at the first sensor. The movement from the determined position to the second position may be based on the known position of the second sensor relative to the first sensor. For example, the translation stage may move the sensors horizontally and/or vertically by the amount that the center of the second sensor is offset horizontally and/or vertically from the center of the first sensor.

Additionally or alternatively, the alignment may be determined based on whether a minimum amount of power of the optical communication beam 352 transmitted from the one or more transmitters 342 of the communication device 340 is received at the one or more receivers 158 of the communication device 156. Optical communication beam 352 may be transmitted when a request is received from the computing device 110 for forming an optical communication link. The request may be transmitted by the computing device 110 to the computing device 310 via a radio-frequency signal or other type of signal. The optical communication beam 352 may alternatively be transmitted when the computing device 310 detects at least a portion of the vehicle 100 within the designated location 360 using one or more sensors that are in communication with the computing device 310. The one or more sensors may include weight sensors, LIDAR, radar, or other type of sensors, and may be located at the depot 302 or the designated location 360. In this example, the computing device 110 may track the amount of power received at the one or more receivers 158 and control the vehicle according to this received power instead of the received power at the one or more receivers 344 of the computing device 310.

At block 506, the computing device 110 may establish at least one optical communication link between the vehicle 100 and the computing device 310 when the alignment is determined. As shown in FIG. 4, the at least one optical communication link includes at least optical communication link 450, which allows for transmission of data from the one or more transmitters 157 at the vehicle 100 to the one or more receivers 344 of the computing device 310. When the one or more transmitters 157 are configured to output a plurality of optical communication beams at different angles, establishing at least one optical communication link may include selecting a given beam from the plurality of optical communication beams that has a greatest amount of received power at the one or more receivers 344 of the computing device 310. The selection may be performed by operating each communication beam in turn, receiving an indication of RSSI from the computing device 310 for each, and selecting the communication beam associated with the greatest RSSI. When the computing device 310 has a plurality of receivers, establishing the at least one optical communication link may alternatively or additionally include selecting a receiver from the plurality of receivers that has a greatest amount of received power and establishing at least one optical communication link with the selected receiver.

In other implementations, establishing the at least one optical communication link includes adjusting a pointing direction of the one or more transmitters 157 to maximize the amount of received power at the one or more receivers 344 of the computing device 310. In these implementations, the communication device 156 may include a gimbal or other mechanism for physically adjusting the pointing direction of the optical communication beam 350 and/or a phased array or other mechanism for electronically adjusting the pointing direction of the optical communication beam 350. The computing device 110 may adjust the pointing direction of the one or more transmitters 157 by moving the pointing direction in a plurality of pointing directions while the vehicle 100 is stationary, tracking an amount of received power continually or at intervals while moving the pointing direction, and selecting a pointing direction of the plurality of pointing directions where the amount of received power is greatest.

At block 508, once the at least one optical communication link is established, the computing device 110 may transmit data to the computing device 310 at the depot 302 over the at least one optical communication link. The data may include data collected by the vehicle 100, such as road condition information, traffic information, vehicle status information, location data, etc. The computing device 310 may store the received data in its memory 330 or transmit the received data to another computing device via a network.

In some implementations, the at least one optical communication link may also include optical communication link 452, as shown in FIG. 4, which allows for transmission of data from the one or more transmitters 342 at the computing device 310 to the one or more receivers 158 at the vehicle 100. This data transmitted from the computing device 310 to the vehicle 100 may include information received from another computing device, such as a remote server, a storage device, or a second vehicle that previously uploaded data to the computing device 310.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of

The invention claimed is:

1. A system comprising:
a driving system configured to operate a vehicle autonomously;
a transmitter mounted on the vehicle; and
a computing device in communication with the driving system and the transmitter, the computing device being configured to:
operate the driving system to move the vehicle through a predetermined area proximate to a structure in which a remote computing device is located, the remote computing device including one or more optical receivers;
control the transmitter to transmit a plurality of optical beams at different angles while the vehicle moves through the predetermined area;
receive one or more signals from the remote computing device in response to the plurality of optical beams, the one or more signals indicating a signal strength of each of the plurality of optical beams that has been received by the one or more optical receivers of the remote computing device while the vehicle moved through the predetermined area;
select one of the plurality of optical beams based on the signal strength of each of the plurality of optical beams that has been received;
control the transmitter using the selected one of the plurality of optical beams to establish at least one optical communication link between the transmitter and the one or more optical receivers; and
control the transmitter to transmit data to the one or more optical receivers over the at least one optical communication link.

2. The system of claim 1, wherein the selected one of the plurality of optical beams has a signal strength that is greater than any other optical beam of the plurality of optical beams.

3. The system of claim 1, wherein the plurality of optical beams are coplanar.

4. The system of claim 3, wherein at least one of the plurality of optical beams overlap at least one other beam of the plurality of optical beams.

5. The system of claim 1, wherein the plurality of optical beams is configured in a fan arrangement.

6. The system of claim 1, wherein the computing device is further configured to determine when a minimum amount of power of the selected one of the plurality of optical beams has been received by the one or more optical receivers.

7. The system of claim 6, wherein the minimum amount of power of the selected one of the plurality of optical beams is a preset value.

8. The system of claim 7, wherein the computing device is further configured to operate the driving system to cause the vehicle to slow down when it is determined that the minimum amount of power of the selected one of the plurality of optical beams has been received.

9. The system of claim 1, further comprising a receiver mounted on the vehicle.

10. The system of claim 1, further comprising a gimbal configured to physically adjust a pointing direction of the selected one of the plurality of optical beams.

11. The system of claim 1, further comprising a phased array configured to physically adjust a pointing direction of the selected one of the plurality of optical beams.

12. The system of claim 1, further comprising a communication device including the transmitter, at least one other transmitter and a plurality of receivers.

13. A system comprising:
a driving system configured to operate a vehicle autonomously;
a transceiver mounted on the vehicle; and
a computing device in communication with the driving system and the transceiver, the computing device being configured to:
operate the driving system to move the vehicle through a predetermined area proximate to a structure in which a remote computing device is located, the remote computing device including one or more optical receivers; and
control the transceiver to transmit a plurality of optical beams at different angles while the vehicle moves through the predetermined area;
wherein the transceiver is further configured to receive one or more signals from the remote computing device in response to the plurality of optical beams, the one or more signals indicating a signal strength of each of the plurality of optical beams that has been received by the one or more optical receivers of the remote computing device while the vehicle moved through the predetermined area.

14. The system of claim 13, wherein the computing device is further configured to:
select one of the plurality of optical beams based on the signal strength of each of the plurality of optical beams that has been received;
control the transceiver using the selected one of the plurality of optical beams to establish at least one optical communication link between the transceiver and the one or more optical receivers; and
control the transceiver to transmit data to the one or more optical receivers over the at least one optical communication link.

15. The system of claim 14, wherein the selected one of the plurality of optical beams has a signal strength that is greater than any other optical beam of the plurality of optical beams.

16. The system of claim 14, wherein the plurality of optical beams are coplanar.

17. The system of claim 16, wherein at least one of the plurality of optical beams overlap at least one other beam of the plurality of optical beams.

18. The system of claim 14, wherein the plurality of optical beams is configured in a fan arrangement.

19. The system of claim 14, wherein the computing device is further configured to determine when a minimum amount of power of the selected one of the plurality of optical beams has been received by the one or more optical receivers.

20. The system of claim 19, wherein the minimum amount of power of the selected one of the plurality of optical beams is a preset value.

21. The system of claim 20, wherein the computing device is further configured to operate the driving system to cause the vehicle to slow down when it is determined that the minimum amount of power of the selected one of the plurality of optical beams has been received.

* * * * *

UNITED STATES PATENT AND TRADEMARK OFFICE
CERTIFICATE OF CORRECTION

| | |
|---|---|
| PATENT NO. | : 11,855,691 B1 |
| APPLICATION NO. | : 17/831084 |
| DATED | : December 26, 2023 |
| INVENTOR(S) | : Michael Sleator |

It is certified that error appears in the above-identified patent and that said Letters Patent is hereby corrected as shown below:

In the Claims

Claim 13, Column 16, Lines 25 and 26:
Now reads: "through the predetermined area; wherein the transceiver;" should read -- through the predetermined area, wherein the transceiver --

Signed and Sealed this
Sixth Day of February, 2024

Katherine Kelly Vidal
*Director of the United States Patent and Trademark Office*